United States Patent
Takita (10) Patent No.: US 8,913,161 B2
(45) Date of Patent: Dec. 16, 2014

(54) IMAGE CAPTURING APPARATUS AND CONTROL METHOD THEREOF

(75) Inventor: Taro Takita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/368,832

(22) Filed: Feb. 8, 2012

(65) Prior Publication Data

US 2012/0224086 A1  Sep. 6, 2012

(30) Foreign Application Priority Data

Mar. 2, 2011 (JP) ................................. 2011-045703

(51) Int. Cl.
| | |
|---|---|
| H04N 5/217 | (2011.01) |
| H04N 9/64 | (2006.01) |
| H04N 5/365 | (2011.01) |
| H04N 5/345 | (2011.01) |
| H04N 5/361 | (2011.01) |

(52) U.S. Cl.
CPC ............ *H04N 5/361* (2013.01); *H04N 5/3658* (2013.01); *H04N 5/3454* (2013.01)
USPC .......................................... 348/241; 348/251

(58) Field of Classification Search
USPC ............... 348/208.99, 208.12, 246, 241, 243, 348/245, 247, 248, 250, 251, 255, 308, 294, 348/302, 304, 300
See application file for complete search history.

(56) References Cited

U.S. PATENT DOCUMENTS

| | | | |
|---|---|---|---|
| 6,900,837 B2* | 5/2005 | Muramatsu et al. | 348/243 |
| 7,843,500 B2* | 11/2010 | Chou | 348/243 |
| 7,969,487 B2* | 6/2011 | Matsuda | 348/243 |
| 2001/0005226 A1* | 6/2001 | Muramatsu et al. | 348/304 |
| 2007/0046783 A1* | 3/2007 | Shimada | 348/208.99 |
| 2009/0256923 A1* | 10/2009 | Chou | 348/222.1 |
| 2010/0194935 A1 | 8/2010 | Okado | |

FOREIGN PATENT DOCUMENTS

| | | |
|---|---|---|
| CN | 101064770 A | 10/2007 |
| CN | 101257560 A | 9/2008 |
| CN | 101309361 A | 11/2008 |
| CN | 101635790 A | 1/2010 |
| JP | 2005-192250 | 7/2005 |
| JP | 2008-236271 A | 10/2008 |
| JP | 2011-004321 A | 1/2011 |

OTHER PUBLICATIONS

Jul. 11, 2014 Chinese Office Action, which is enclosed with an English Translation, that issued in Chinese Patent Application No. 201210053863.6.

* cited by examiner

*Primary Examiner* — Ahmed A Berhan
(74) *Attorney, Agent, or Firm* — Cowan, Liebowitz & Latman, P.C.

(57) ABSTRACT

An image capturing apparatus comprises an image sensing element including an effective pixel portion, and a shading pixel portion; a setting unit which variably sets, in at least one of row and column directions, an effective pixel signal readout region and shading pixel signal readout region; a readout unit which reads out the effective pixel signals and reads out the shading pixel signals; a correction data generation unit which generates correction data for each column or each row; a correction unit which corrects luminance levels of the effective pixel signals, for each column or each row; and a control unit which controls the setting unit so that the shading pixel signal readout region becomes wider than the effective pixel signal readout region.

22 Claims, 7 Drawing Sheets

IMAGE CAPTURING APPARATUS AND CONTROL METHOD THEREOF

BACKGROUND OF THE INVENTION

1. Field of the Invention

The present invention relates to an image capturing apparatus and a control method of an image capturing apparatus, particularly relates to a correction processing technique for image data obtained by capturing an image.

2. Description of the Related Art

An image capturing apparatus typified by a digital still camera and a video camera is equipped with an image sensing element which converts an optical image of an object into an electrical signal. Among various types of image sensing elements, especially a CMOS image sensor including an amplifier arranged on each column (to be referred to as a column amplifier hereinafter) is a mainstream image sensing element. However, this image sensor often generates variations in luminance value due to variations in electrical characteristics of the individual column amplifiers, and, in turn, generates vertical streaks. To correct these vertical streaks, a shading portion (to be referred to as a VOB portion hereinafter) is provided to cover the entire pixel region including all pixels aligned horizontally (in the row direction) at the end portion (on about 10 lines) of the pixel region, and correction data is generated for each column based on signals (to be referred to as VOB signals hereinafter) output from this VOB portion, thereby executing correction using the difference between the correction data and the image data in the effective pixel region.

VOB data contains random noise components, so VOB signals are averaged for each column to generate correction data. This averaging processing produces an effect of eliminating the random noise components, but requires a large number of VOB signals and, for example, requires a long period of time to process 256 data corresponding to about 25 frames until the correction data converges.

An electronic antivibration function is implemented by defining a region (extraction region) smaller than the entire pixel region of the sensor as an effective pixel region for use in image output, and a pixel region other than the effective pixel region as an electronic antivibration region, and variably setting the extraction region for each frame. This electronic antivibration function is implemented by reading out signals from a pixel region including the electronic antivibration region from the CMOS image sensor, performing the aforementioned vertical streak correction, and arbitrarily extracting output image data.

Since the CMOS image sensor can randomly access (read out signals from an arbitrary region on) the image data, the aforementioned electronic antivibration function can be implemented by variably controlling the readout region. The region (the number of pixels) from which the sensor reads out signals is limited in this way, thereby reducing the frequency and power consumption in pixel signal transfer.

However, in the aforementioned electronic antivibration technique, the readout region changes for each column frame. Hence, when the readout region shifts horizontally (in the row direction), correction is executed based on correction data for different columns because correction data is generated by averaging VOB signals.

For this reason, to obtain appropriate correction data, it is necessary to read out VOB signals from the same readout region by about 25 frames, so precise correction data is not generated in electronic antivibration control under which the readout region is variably set for each frame, thus generating vertical streaks.

SUMMARY OF THE INVENTION

The present invention has been made in consideration of the aforementioned problems, and realizes an image data correction processing technique which can suppress degradation in image quality without generating vertical streaks even when the readout region of a sensor is changed.

In order to solve the aforementioned problems, the present invention provides an image capturing apparatus comprising: an image sensing element including an effective pixel portion in which a plurality of pixels are two-dimensionally arrayed in a row direction and a column direction, and a shading pixel portion provided on at least one line at an end portion of the effective pixel portion in the row direction or the column direction; a setting unit configured to variably set, in at least one of the row direction and the column direction, an effective pixel signal readout region in which effective pixel signals are read out from the effective pixel portion, and a shading pixel signal readout region in which shading pixel signals are read out from the shading pixel portion; a readout unit configured to read out the effective pixel signals from the effective pixel signal readout region, and read out the shading pixel signals from the shading pixel signal readout region; a correction data generation unit configured to generate correction data for each column or each row based on the shading pixel signals read out by the readout unit; a correction unit configured to correct luminance levels of the effective pixel signals, read out by the readout unit, for each column and each row using the correction data; and a control unit configured to control the setting unit so that the shading pixel signal readout region becomes wider than the effective pixel signal readout region.

In order to solve the aforementioned problems, the present invention provides a control method of an image capturing apparatus comprising an image sensing element including an effective pixel portion in which a plurality of pixels are two-dimensionally arrayed in a row direction and a column direction, and a shading pixel portion provided on at least one line at an end portion of the effective pixel portion in the row direction or the column direction; a setting unit configured to variably set, in at least one of the row direction and the column direction, an effective pixel signal readout region in which effective pixel signals are read out from the effective pixel portion, and a shading pixel signal readout region in which shading pixel signals are read out from the shading pixel portion; and a readout unit configured to read out the effective pixel signals from the effective pixel signal readout region, and read out the shading pixel signals from the shading pixel signal readout region, the method comprising: a correction data generation step of generating correction data for each column or each row based on the shading pixel signals read out by the readout unit; a correction step of correcting luminance levels of the effective pixel signals, read out by the readout unit, for each column or each row using the correction data; and a control step of controlling the setting unit so that the shading pixel signal readout region becomes wider than the effective pixel signal readout region.

According to the present invention, it is possible to obtain appropriate vertical streak correction data for each column even when the readout region of a sensor is changed, thus suppressing degradation in image quality without generating vertical streaks.

Further features of the present invention will become apparent from the following description of exemplary embodiments with reference to the attached drawings.

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

[First Embodiment]

An image capturing apparatus according to the present invention will be described below by taking a digital camera as an example. Note that the image capturing apparatus not only includes, for example, a digital still camera and a digital video camera but also includes an apparatus having an image file generation function, with which light from an object is photoelectrically converted and captured to generate image data.

<Configuration of Digital Camera>

The configuration of a digital camera according to an embodiment of the present invention will be described with reference to FIG. 1.

Figure 1:
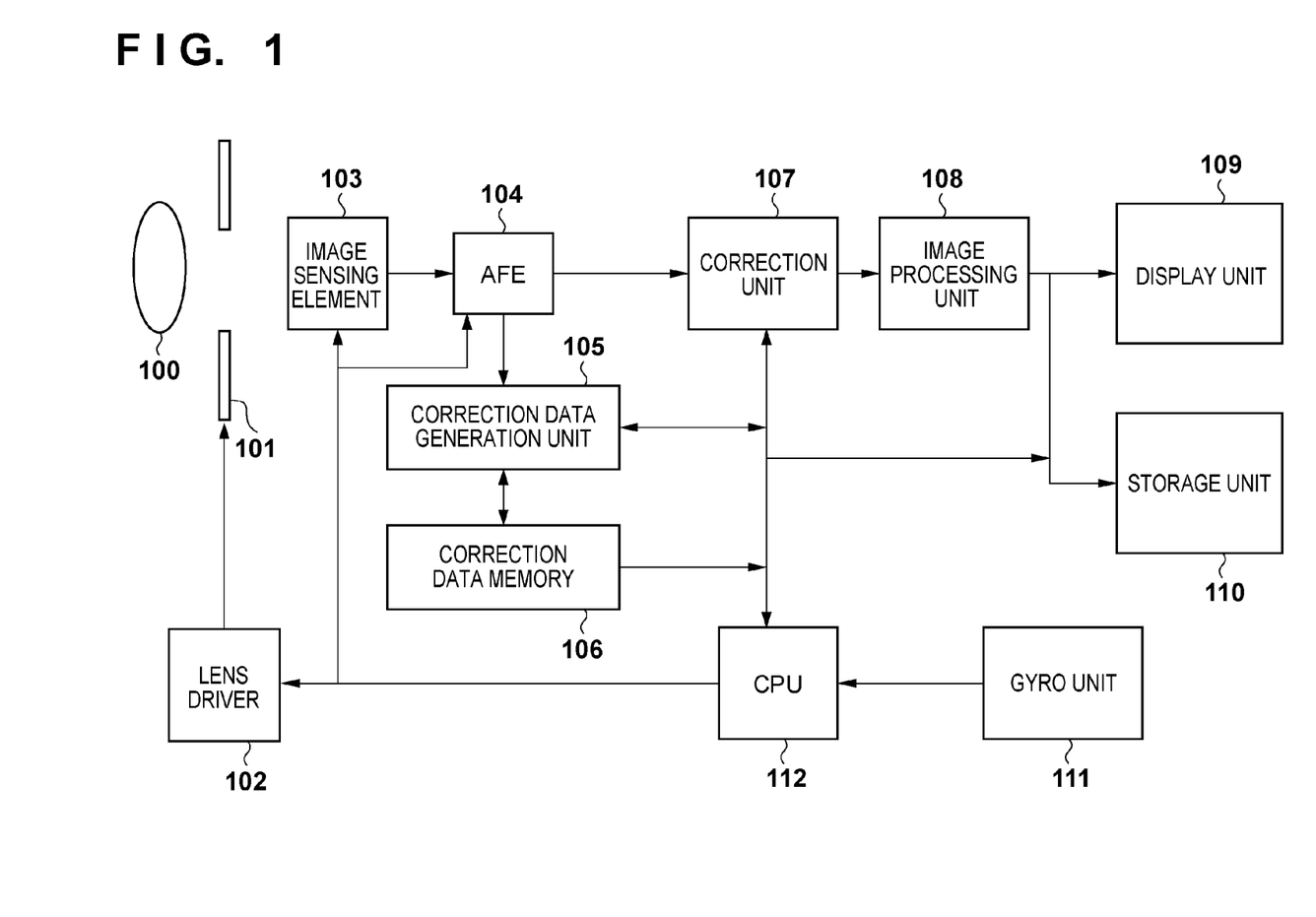
FIG. 1 is a block diagram of an image capturing apparatus according to an embodiment of the present invention.

Referring to FIG. 1, a lens group 100 converges an optical image of an object on the image sensing surface of an image sensing element 103. The lens group 100 includes an AF (AutoFocus) mechanism and zoom mechanism for focusing.

A stop unit 101 performs AE (AutoExposure control) for adjusting the amount of light on an object image, and is driven to maintain a captured image at an appropriate luminance level in accordance with the electronic shutter time (exposure time) (to be described later) and the gain.

A lens driver 102 drives the stop unit 101 and the lens group 100 including, for example, a focus lens and zoom lens under the control of a CPU 112 (to be described later).

Figure 2:
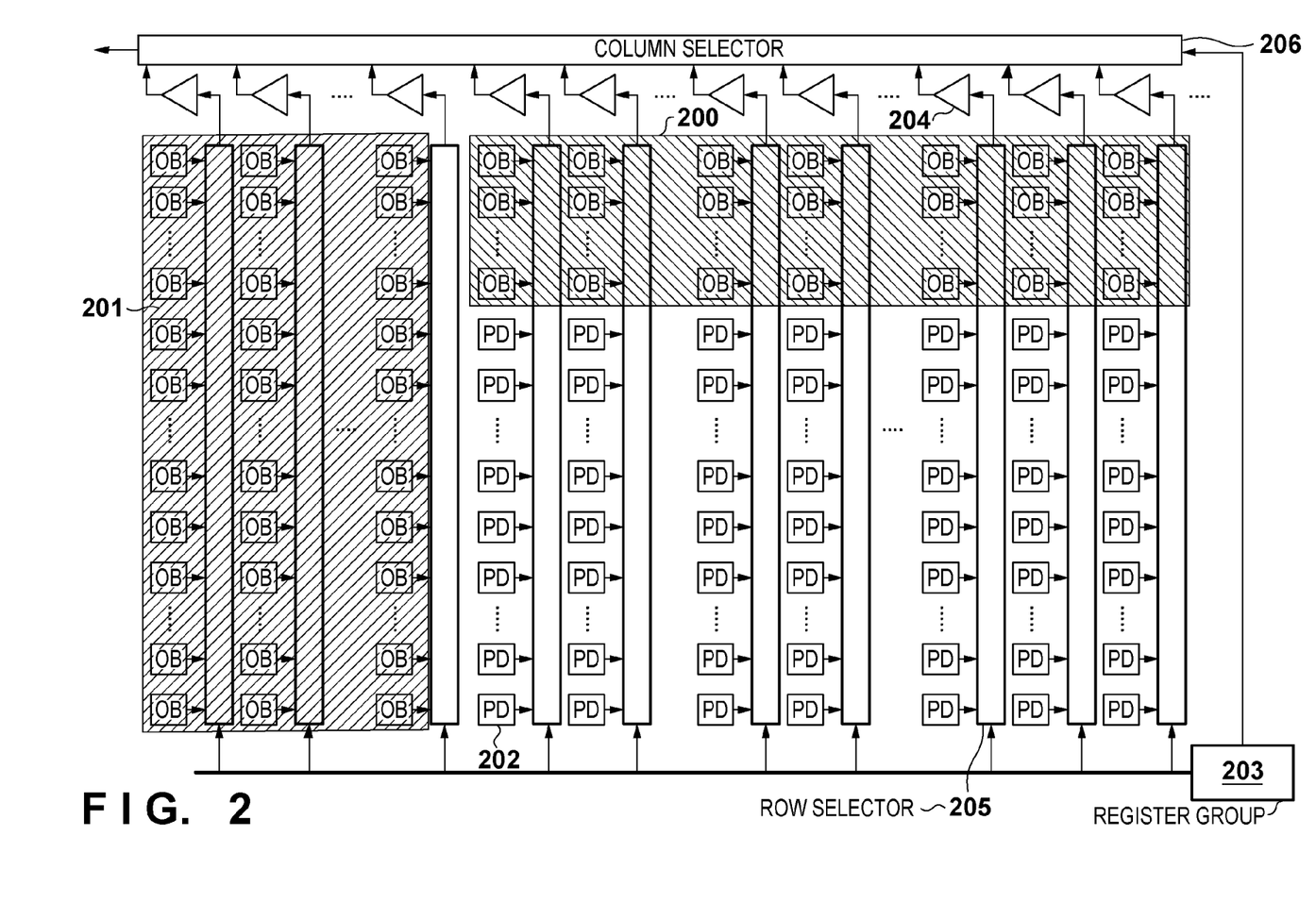
FIG. 2 is a diagram showing the internal configuration of a CMOS image sensor according to the embodiment.

The image sensing element 103 serves as a CMOS image sensor formed by a semiconductor image sensing element which converts an optical image of an object, that is formed by light having passed through the lens group 100, into an electrical signal. The image sensing element 103 reads out pixel signals from an arbitrary region (readout region) corresponding to a preset readout start position under the control of the CPU 112. The image sensing element 103 includes an effective pixel portion, a VOB portion 200, and an HOB portion 201. In the effective pixel portion, a plurality of pixels including photodiodes (PDs) 202 serving as photoelectric conversion elements (to be described later) are two-dimensionally arrayed in the row direction (horizontally) and the column direction (vertically). Each of the VOB portion 200 and HOB portion 201 serves as a shading pixel portion provided on at least one line at each of the two end portions of the effective pixel portion in the column and row directions.

An AFE (Analog Front End) 104 serves as an analog signal processing circuit including a CDS circuit for detecting a signal level from an analog pixel signal output from the image sensing element 103, and an A/D conversion unit for converting the analog pixel signal into a digital signal.

A correction data generation unit 105 generates vertical streak correction data for each column based on vertical OB signals (VOB signals) serving as first shading pixel signals which are output from the image sensing element 103 and A/D-converted by the AFE 104.

A correction data memory 106 stores correction data for each column, which is used to correct, for each column, effective pixel signals output from the aforementioned effective pixel portion.

A correction unit 107 reads out correction data for each column from the correction data memory 106, and executes, for each column, correction processing for the luminance levels of effective pixel signals output from the AFE 104.

An image processing unit 108 executes various types of image processing such as gamma correction, aperture correction, and color balance correction for a digital image signal output from the AFE 104, converts the processed signal into a desired moving image format, and outputs the converted signal to a display unit 109 and a storage unit 110 (both will be described later).

The display unit 109 uses, for example, an LCD and displays image data output from the image processing unit 108.

The storage unit 110 includes, for example, an SD card and flash memory and stores moving image data such as MPEG data.

A gyro unit 111 uses, for example, an acceleration sensor and detects the blur amount of the camera due mainly to camera shakes.

The CPU 112 systematically controls each unit of a digital camera serving as the image capturing apparatus shown in FIG. 1.

<Configuration of Image Sensing Element>

The internal configuration of a CMOS image sensor which can arbitrarily change the readout region of the image sensing element 103 shown in FIG. 1 will be described next with reference to FIG. 2.

Referring to FIG. 2, the vertical OB (VOB) portion 200 serving as a first shading pixel portion is an OB portion in which a shading film is arranged to prevent light from impinging on the photodiodes 202 (to be described later). The VOB portion 200 is provided at the end portion of the effective pixel portion in the column direction (vertical direction) in this embodiment, and shades pixels on 10 lines in the column direction against light.

The horizontal OB (HOB) portion 201 serving as a second shading pixel portion is provided at the end portion of the effective pixel portion in the row direction (horizontal direction). The HOB portion 201 is an OB portion in which a shading film is arranged, like the VOB portion 200, and shades pixels on a plurality of columns in the row direction (horizontal direction) against light.

The photodiode (PD) 202 which constitutes each pixel photoelectrically converts incident light into a charge signal, and outputs it. Pixels arranged in an unshaded portion other than the VOB portion 200 and HOB portion 201 serve as effective pixels, which photoelectrically convert light from an object into effective pixel signals.

A register group 203 is connected to the CPU 112, and sets various functions such as an electronic shutter, the readout start position, and the readout region.

A column amplifier 204 serves to amplify a pixel signal selected by a row selector 205 (to be described later), and is arranged on each column.

The row selector 205 selects the PD 202, VOB portion 200, and HOB portion 201 on an arbitrary row based on the readout start position and readout region set in the register group 203, and outputs each pixel signal to a column selector 206 (to be described later).

The column selector 206 sequentially reads out pixel signals selected based on the readout start position and readout region set in the register group 203, selects them for each column, and outputs them to the AFE 104.

First, upon power-on, the CPU 112 performs initial settings.

Then, the readout region in the row direction (horizontal direction) and the column direction (vertical direction), and the readout start address are set in the register group 203, and the correction data generation unit 105 and correction unit 107 shown in FIG. 1.

<Readout Region>

The readout region of the CMOS image sensor will be described next with reference to FIG. 3.

Figure 3:
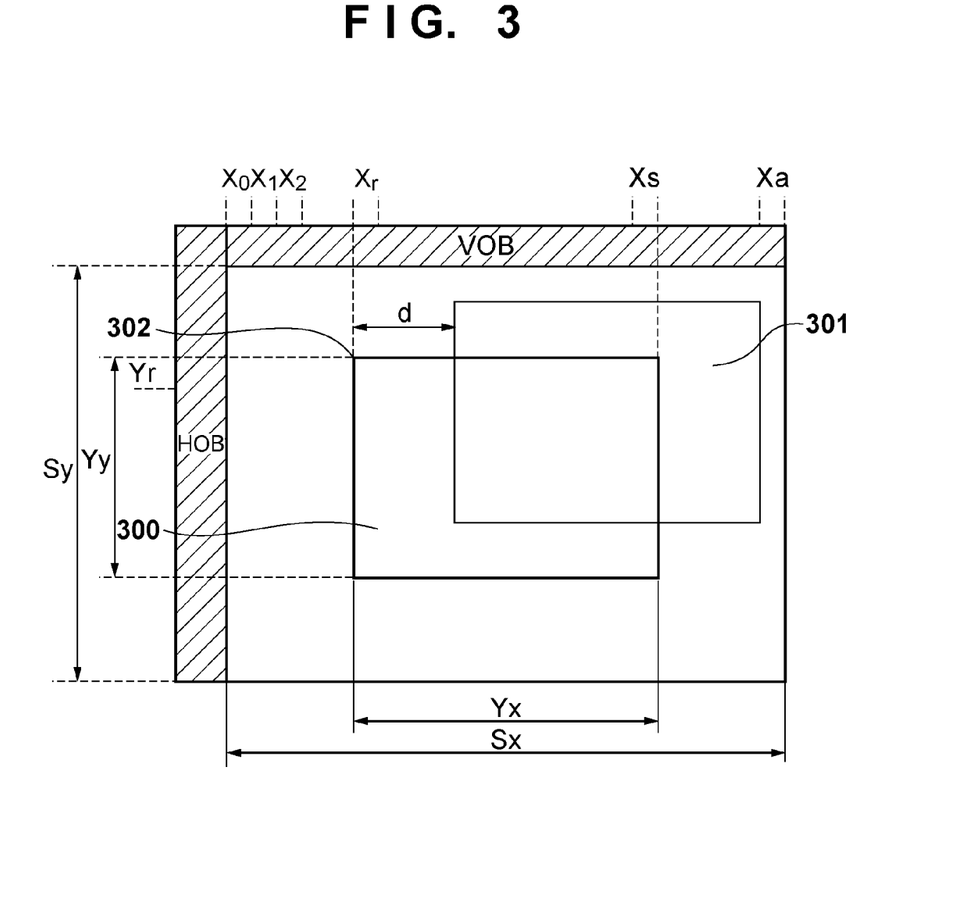
FIG. 3 is a view showing the readout region of the CMOS image sensor in the embodiment.

As an effective pixel signal readout region 300 of the CMOS image sensor, a readout region $Y_x$ in the row direction (horizontal direction) is set with respect to an entire region $S_x$ in the row direction (horizontal direction), and a readout region $Y_y$ in the column direction (vertical direction) is set with respect to an entire region $S_y$ in the column direction (vertical direction), as shown in FIG. 3.

Also, a readout start address 302 corresponding to the effective pixel signal readout region 300 is a coordinate position $(X_r, Y_r)$.

In this case, the effective pixel signal readout region 300 is the initial setting position set to serve as the sensor center and optical center with respect to the effective pixel region of the CMOS image sensor.

The readout region $Y_x$ in the horizontal direction (row direction), the readout region $Y_y$ in the vertical direction (column direction), and the readout start address $(X_r, Y_r)$ are set in the register group 203.

A region other than the effective pixel signal readout region 300 serves as an electronic antivibration region, and the CPU 112 changes the readout start address in accordance with the blur amount detected by the gyro unit 111, thereby implementing an electronic antivibration function which allows readout of signals from an arbitrary region.

After initial settings are completed, the stop unit and focus lens are controlled in accordance with AE control to irradiate the CMOS image sensor with predetermined light, and photoelectrically convert this light during a set exposure time.

HOB signals serving as second shading pixel signals corresponding to the effective pixel signal readout region 300 shown in FIG. 3 are read out.

The readout HOB signals are averaged by the AFE 104, and stored as black level for clamp processing.

VOB signals are output from the entire region (corresponding to columns $X_0, X_1, X_2, X_3, \ldots, X_a$) in the row direction (horizontal direction) on the first row to the AFE 104.

In this case, the VOB signal from the column $X_0$ is defined as VOBx0, that from the column $X_1$ is defined as VOBx1, . . . , and that from the column $X_a$ is defined as VOBxa.

The readout VOB signals serving as first shading pixel signals are clamped to black level based on the HOB signals by the AFE 104, and input to the correction data generation unit 105.

<Correction Data Generation Processing>

Correction data generation processing will be described next with reference to FIG. 4.

Figure 4:
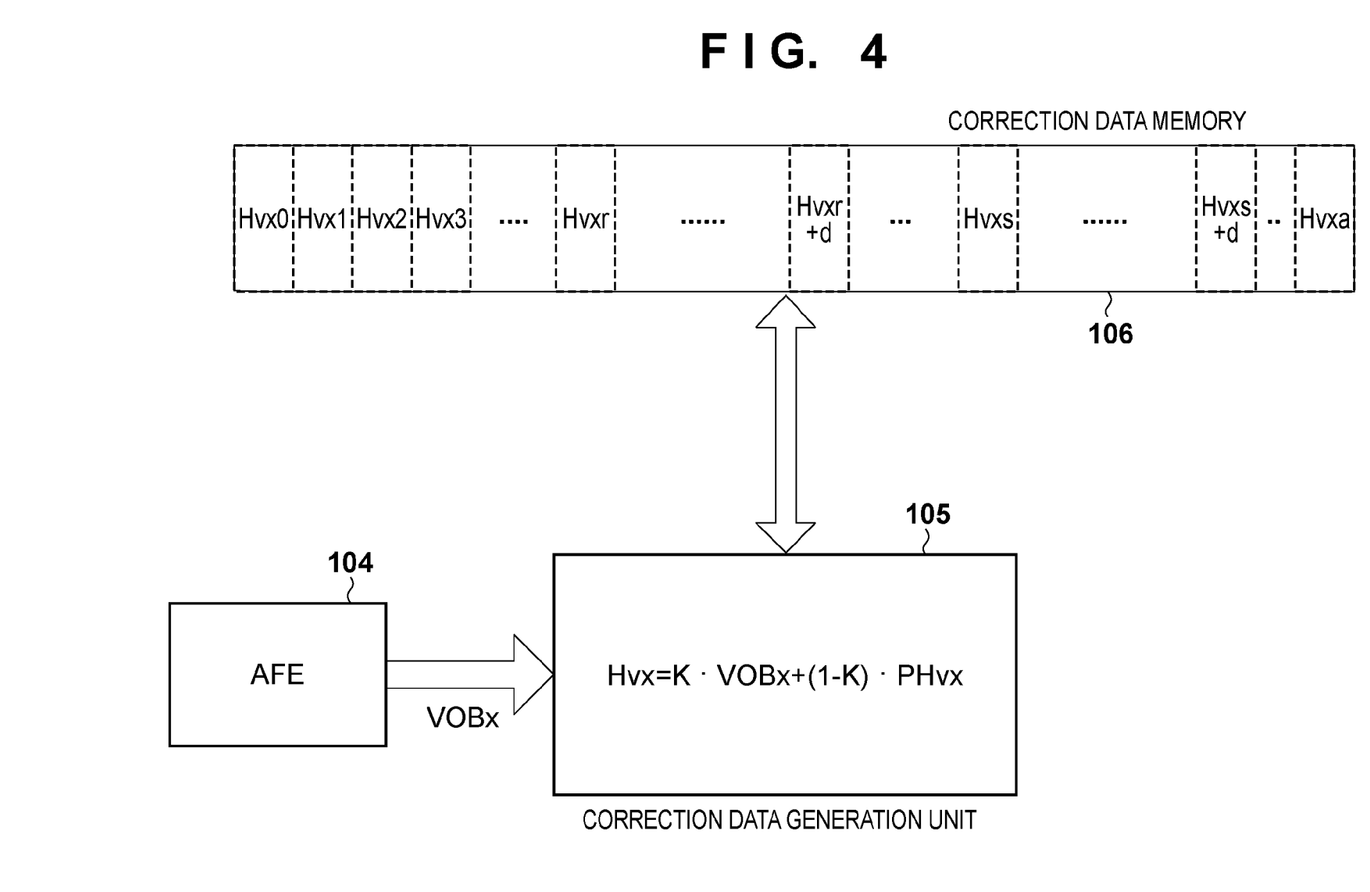
FIG. 4 is a view for explaining correction data generation processing in the first embodiment.

A given initial value is stored in the correction data memory 106 as correction data, this correction data is updated based on the calculation result obtained using the sequentially input VOB signals, and the latest correction data is stored, as shown in FIG. 4.

In this case, the correction data for the column $X_0$ is defined as HVx0, that for the column $X_1$ is defined as HVx1, . . . , and that for the column $X_a$ is defined as HVxa.

First, when the correction data generation unit 105 inputs the VOB signal from the column $X_0$, that is, VOBx0 from the AFE 104, it reads out the current correction data HVx0 corresponding to the column $X_0$ from the correction data memory 106. Then, in an IIR filter calculation equation expressed as:

$$HVx = K \cdot VOBx + (1-K) \cdot PHVx$$

(0<K<1; K: Cyclic Coefficient)          (1)

the correction data HVx0 read out from the correction data memory 106 is input as PHVx corresponding to the current correction value. Also, the VOB signal from the column $X_0$, that is, VOBx0 is input as VOBx in equation (1). Calculating equation (1) yields (generates) new correction data HVx0.

As the value of the cyclic coefficient K comes closer to one, the convergence time of the correction data HVx0 shortens, but random noise in the VOB portion becomes more likely to produce an adverse effect. However, as the value of the cyclic coefficient K comes closer to zero, random noise in the VOB portion becomes less likely to produce an adverse effect, but the convergence time of the correction data HVx0 prolongs.

In this case, a value expected to be appropriate for experiments and other purposes, that is, $K = 1/256$ is used.

When the cyclic coefficient K is $1/256$, about 256 VOB signals are necessary for convergence, so VOB signals of about 25 frames are necessary if the VOB portion includes 10 lines. New correction data HVx0 calculated (generated) by the correction data generation unit 105 is rewritten into HVx0 in the correction data memory 106. That is, the correction data in the correction data memory 106 is updated.

Also, when the correction data generation unit 105 inputs the VOB signal from the column $X_1$, that is, VOBx1 from the AFE 104, the currently stored correction data HVx1 corresponding to the column $X_1$ is similarly read out from the correction data memory 106. Then, new correction data HVx1 obtained by the same calculation operation as described above is rewritten to update the correction data in the correction data memory 106.

When the aforementioned processing is repeated so that the correction data HVxa corresponding to the column $X_a$ is updated, the readout of the VOB signal from the first line of the VOB portion, and the correction data generation processing end.

Similarly, the second line of the VOB portion is selected by the row selector 205, and VOB signals are sequentially input to the AFE 104 by the column selector 206.

Similarly to the first line of the VOB portion, the correction data corresponding to the respective columns $X_0$ to $X_a$ are updated.

When the aforementioned processing is repeated so that VOB signals corresponding to 25 frames (that is, about 250 columns) are input to the correction data generation unit 105, and the correction data are updated, the correction data converges to an appropriate value.

<Data Readout Processing>

Processing of reading out data from the readout region will be described next.

First, the row $Y_r$ is selected as a readout start address in the column direction (vertical direction) by the row selector 205 from the readout start address $(X_r, Y_r)$ set in the register group 203, and is output to the column selector 206.

The column selector 206 sequentially outputs HOB signals serving as second shading pixel signals to the AFE 104. The AFE 104 averages the input HOB signals as clamp black level, as described earlier.

The column selector 206 outputs a pixel signal from the column $X_r$ serving as a readout start address in the row direction (horizontal direction) to the AFE 104.

The column selector 206 sequentially outputs pixel signals corresponding to columns $X_{r+1}, X_{r+2}, \ldots, X_s$ to the AFE 104.

The AFE 104 clamps the input pixel signal from each column using black level obtained by averaging the HOB signals, and performs CDS processing and A/D conversion. The AFE 104 outputs digital pixel data corresponding to the respective columns $X_4, X_{r+1}, \ldots, X_s$ to the correction unit 107.

<Correction Processing>

Correction processing will be described next with reference to FIG. 5.

Figure 5:
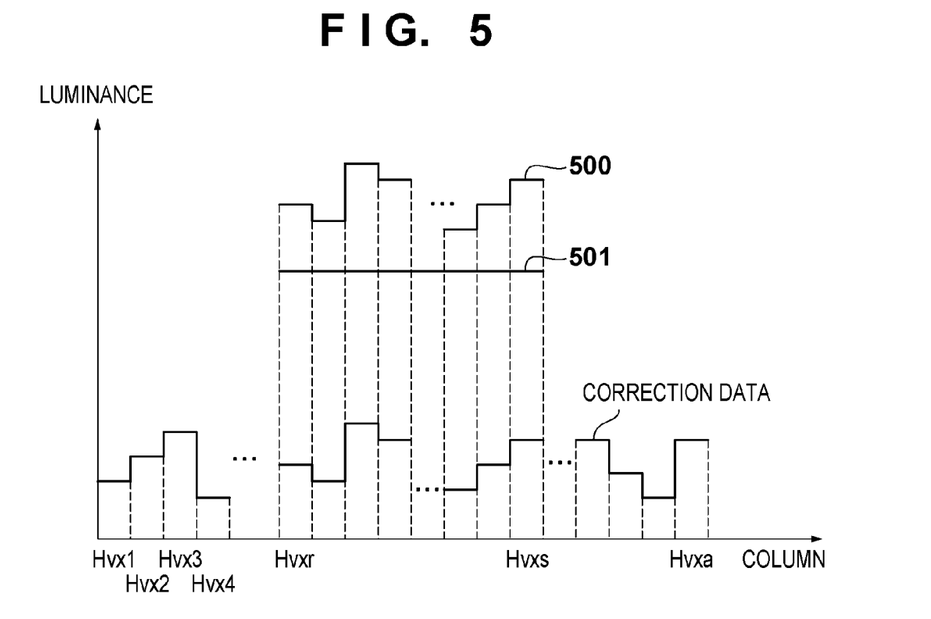
FIG. 5 is a graph for explaining correction processing in the embodiment.

FIG. 5 shows the sensor column on the abscissa, and the luminance level on the ordinate.

Effective pixel data 500 from the respective columns $X_r, \ldots, X_s$ set as an effective pixel signal readout region have variations in luminance level for each column due to variations in electrical characteristics of the individual column amplifiers 204, as shown in FIG. 5.

The CPU 112 sets a readout address in the correction unit 107.

When effective pixel data is read out from the column $X_r$, the correction unit 107 reads out correction data Hvxr for the column $X_r$ from the correction data generation unit 105. The correction unit 107 calculates the difference between the effective pixel data and correction data Hvxr on the column Xr, and outputs it to the image processing unit 108.

Similarly, when effective pixel data is read out from the column $X_{r+1}$, correction data Hvxr+1 corresponding to the column $X_{r+1}$ is read out. When effective pixel data is read out from the column $X_{r+2}$, correction data Hvxr+2 corresponding to the column $X_{r+2}$ is read out. The difference between the effective pixel data and correction data corresponding to each column from which these data are read out is calculated.

By repeating the aforementioned processing, variations in luminance level for each column in the effective pixel data from the columns $X_r$ to $X_s$ are corrected, and a corrected effective pixel signal is output from each column to the image processing unit 108.

By the correction processing as described above, variations in luminance level for each column are corrected, as shown in effective pixel data 501 after correction in FIG. 5.

<Correction Processing After Change in Readout Region by Electronic Antivibration Function>

Correction processing when the readout region is changed by an electronic antivibration function will be described next.

As shown in FIG. 3, when a pixel signal is read out from a readout region 301 upon horizontal shift from the default, effective pixel signal readout region 300 by "d", $X_{r+d}$ is set in the register group 203 as a readout start address in the horizontal direction in accordance with the amount of shift. This shift exerts no particular influence on the readout start address in the vertical direction.

VOB signals are read out from the entire region in the horizontal direction on the columns $X_0$ to $X_a$ to update the correction data, as described earlier.

After VOB signal readout is completed, a pixel signal is output from a row set by the row selector 205 based on the readout start address in the vertical direction to the column selector 206.

The column selector 206 outputs HOB signals to the AFE 104. The AFE 104 averages the HOB signals as clamp black level, as described earlier. The column selector 206 selects the column $X_{r+d}$ based on the readout start address in the horizontal direction set in the register group 203, and outputs a pixel signal from this column to the AFE 104.

The column selector 206 sequentially outputs pixel signals from the respective columns $X_{r+d+1}, X_{r+d+2}, \ldots, X_{s+d}$ to the AFE 104.

The AFE 104 clamps the input pixel signal using black level obtained by averaging the HOB signals, and performs CDS processing and A/D conversion. The AFE 104 outputs digital pixel data from each column to the correction unit 107, in the same way as described earlier.

Correction processing when a pixel signal is read out from the column $X_{r+d}$ serving as a readout start address will be described next with reference to FIG. 6.

Figure 6:
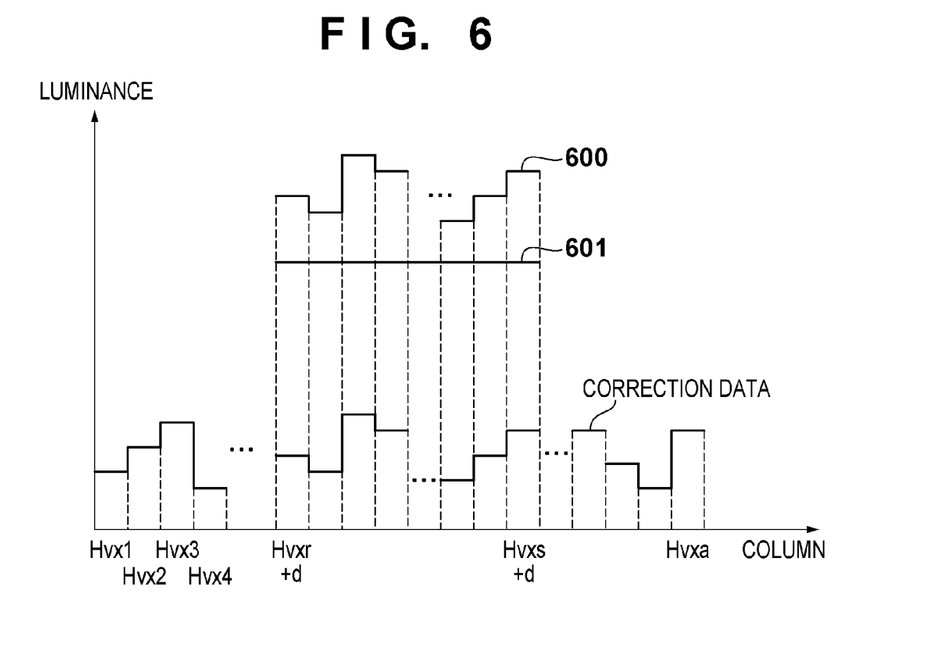
FIG. 6 is a graph for explaining correction processing after a change in readout region in the first embodiment.

Referring to FIG. 6, image data 600 read out from the column $X_{r+d}$ has variations in luminance level for each column due to variations in electrical characteristics of the individual column amplifiers 204.

The correction unit 107 reads out correction data Hvxr+d corresponding to the column $X_{r+d}$ from the correction data memory 106 based on the set readout start address $X_{r+d}$ in the horizontal direction. The difference between the correction data and the pixel data is calculated to perform correction in the same way as described earlier.

When pixel data is output from the column $X_{r+d+1}$, correction data Hvxr+d+1 corresponding to the column $X_{r+d+1}$ is read out from the correction data memory 106.

When the aforementioned processing is repeated so that correction data corresponding to the respective columns $X_{r+d}$ to $X_{s+d}$ are read out from the correction data memory 106, and correction is performed based on these correction data, variations in luminance level for each column are eliminated, as shown in pixel data 601 after correction in FIG. 6.

The pixel data corrected by the correction unit 107 in this way is converted into each recording format, and stored in the storage unit 110 or displayed on the display unit 109.

Note that VOB signals (shading pixel signals) are read out from the entire region in the row direction (horizontal direction) in this embodiment. However, instead of reading out VOB signals (shading pixel signals) from the entire region, the readout region from which they are read out may be controlled based on the maximum variable amount of the effective pixel signal readout address for each frame. In this case, the register group 203 is controlled so that the shading pixel signal readout region becomes wider than the effective pixel signal readout region in the row direction (horizontal direction). By controlling the readout region in this way, the number of VOB signals (shading pixel signals) read out for each frame can be decreased, thus producing an effect of reducing the readout clock and power consumption.

Also, although an example in which the range of the effective pixel signal readout region is changed in the row direction by an electronic antivibration function has been given in this embodiment, this range may be variably set in at least one of the row and column directions. The present invention is also applicable to control under which the effective pixel signal readout region is changed for purposes other than an electronic antivibration function.

Moreover, although correction of variations in luminance level due to variations in electrical characteristics of each individual amplifier arranged on each column has been described in this embodiment, the present invention is not limited to this, and is applicable not only to all types of correction of variations in luminance level for each column but also to various types of correction of variations in luminance level for each row. Note that when variations in luminance level for each row are corrected, the correction data generation unit 105 generates correction data for each row based on HOB signals output from the horizontal OB (HOB) portion in place of VOB signals output from the VOB portion, as explained in the above-described embodiment. The correction unit 107 need only correct the luminance level of the effective pixel signal for each row using the correction data generated for each row.

According to the above-described embodiment, an image capturing apparatus which interlocks with, for example, an electronic antivibration function to change the effective pixel signal readout region performs control so that the shading pixel signal readout region becomes wider than the effective pixel signal readout region in the row direction. This makes it possible to read out a larger number of VOB signals and generate correction data for each column, thereby appropriately correcting vertical streaks due to variations in luminance level even when the effective pixel signal readout region is changed.

[Second Embodiment]

The second embodiment will be described next. Note that the configurations of an image capturing apparatus and CMOS image sensor are the same as in the first embodiment, and a description thereof will not be given.

First, as in the first embodiment, after power-on, initial settings are performed, and not only the readout region and the readout start address but also a frame identification signal is output to a register group 203 and a correction data generation unit 105 in the second embodiment.

The frame identification signal has a signal level which changes between "HIGH" and "LOW" every time one frame is read out. A frame identification signal indicating "HIGH" is output every time an odd-numbered frame is read out, and that indicating "LOW" is output every time an even-numbered frame is read out.

Note that the signal logic may be reversed to that mentioned above, or a setting value may be set in the register group 203 and correction data generation unit 105 in place of a signal.

Readout of VOB signals of the first frame will be described herein with reference to FIG. 7.

First, VOB signals read out from the first row are output from a row selector 205 to a column selector 206 by the register group 203.

When the frame identification signal is at "HIGH" level, this means the odd-numbered frame readout timing. After the column selector 206 outputs HOB signals, it selects VOB signals from the odd-numbered columns (columns $X_0$, $X_2$, $X_4$, ..., $X_{s-1}$) in the effective pixel signal readout region, that is, VOBx0, VOBx2, VOBx4, VOBx6, ..., VOBxs–1, and outputs them to an AFE 104.

Figure 7:
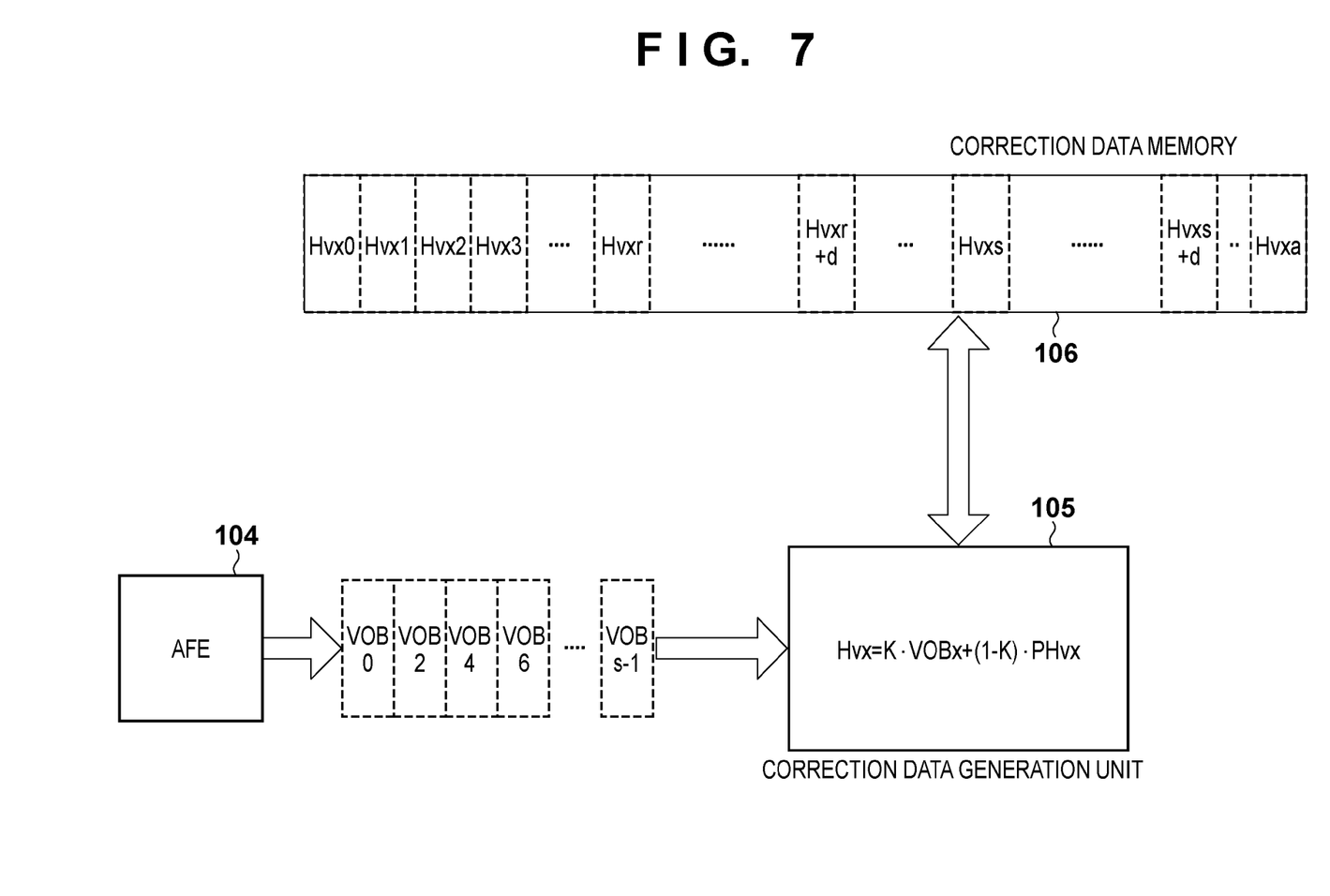
FIG. 7 is a view for explaining correction data generation processing in the second embodiment.

VOBx0, VObx2, VOBx4, VOBx6, ..., VOBxs–1 clamped to black level based on the HOB signals are output from the AFE 104 to the correction data generation unit 105, as shown in FIG. 7.

When the correction data generation unit 105 inputs the VOB signal from the column $X_0$, that is, VOBx0 from the AFE 104, it reads out the current correction data HVx0 corresponding to the column $X_0$ from a correction data memory 106, as in the first embodiment. In IIR filter calculation equation (1), the correction data HVx0 read out from the correction data memory 106 is input as PHvx corresponding to the current correction value. Also, the VOB signal from the column $X_0$, that is, VOBx0 is input as VOBx in equation (1). Equation (1) is calculated to update the correction data HVx0.

When the correction data generation unit 105 inputs the VOB signal from the column $X_2$, that is, VOBx2, it reads out the current correction data HVx2 corresponding to the column $X_2$ from the correction data memory 106, and performs the same calculation operation.

By repeating the aforementioned processing, the correction data HVx0, HVx2, HVx4, ..., HVxs–1 for the odd-numbered columns (columns $X_0$, $X_2$, $X_4$, ..., $X_{s-1}$) are updated when the frame identification signal is at "HIGH" level.

Figure 8:
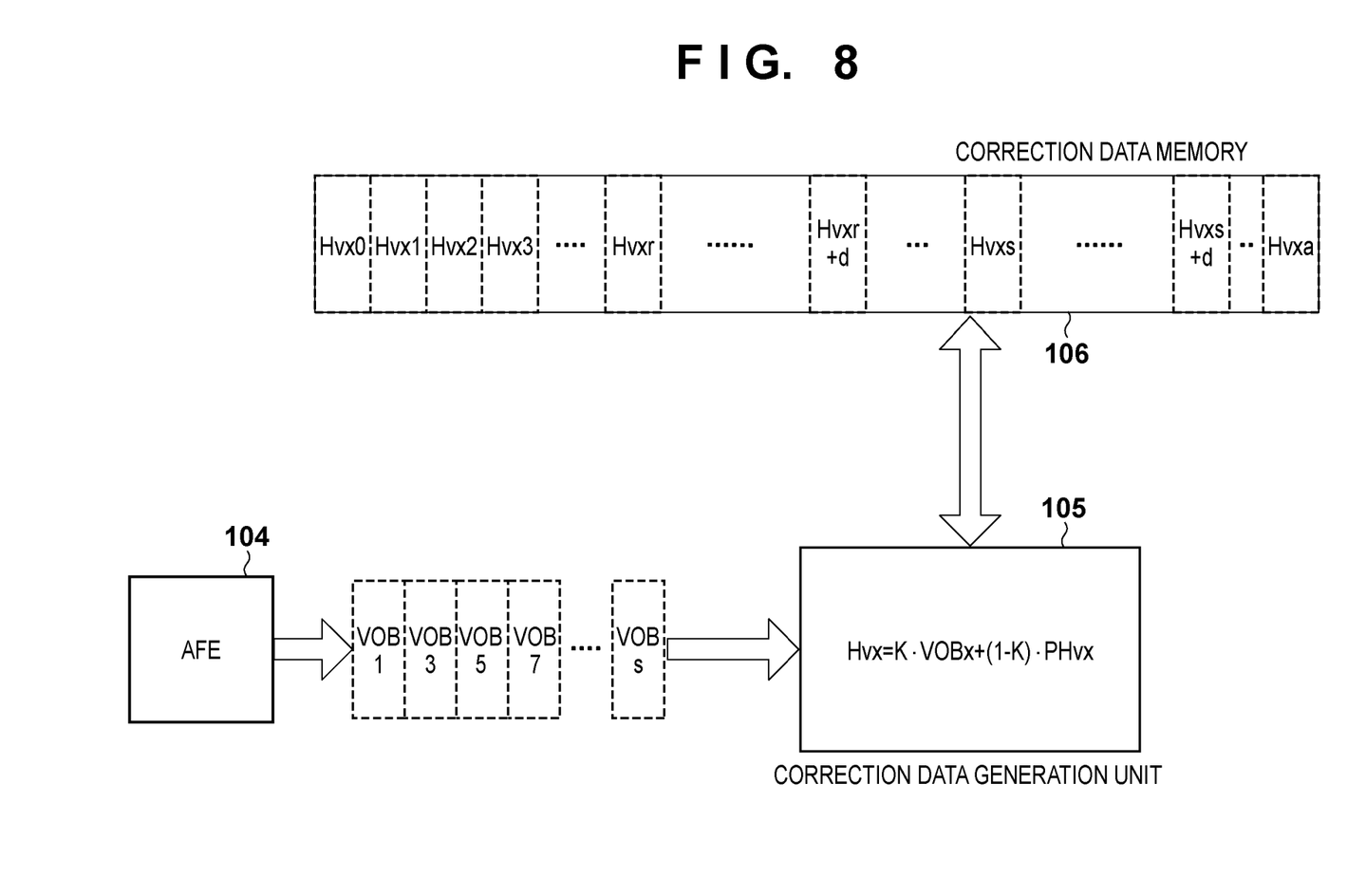
FIG. 8 is a view for explaining correction data generation processing after a change in readout region in the second embodiment.

Readout of VOB signals when the frame identification signal is at "LOW" level will be described next with reference to FIG. 8.

VOB signals read out from the first row are output from the row selector 205 to the column selector 206 by the register group 203.

When the frame identification signal is at "LOW" level, this means the even-numbered frame readout timing. After the column selector 206 outputs HOB signals, it alternately selects VOB signals from the even-numbered columns (columns $X_1$, $X_3$, $X_5$, ..., $X_s$) in the effective pixel signal readout region, that is, VOBx1, VOBx3, VOBx5, ..., VOBx2, and outputs them to the AFE 104.

VOBx1, VObx3, VOBx5, ..., VOBxs clamped to black level based on the HOB signals are output from the AFE 104 to the correction data generation unit 105, as shown in FIG. 7.

When the correction data generation unit 105 inputs the VOB signal from the column $X_1$, that is, VOBx1 from the AFE 104, it reads out the current correction data HVx1 corresponding to the column $X_1$ from the correction data memory 106, as in the first embodiment. In IIR filter calculation equation (1), the correction data HVx1 read out from the correction data memory 106 is input as PHvx corresponding to the current correction value. Also, the VOB signal from the column $X_1$, that is, VOBx1 is input as VOBx in equation (1). Equation (1) is calculated to update the correction data HVx1.

When the correction data generation unit 105 inputs the VOB signal from the column $X_3$, that is, VOBx3, it reads out the current correction data HVx3 corresponding to the column $X_3$ from the correction data memory 106, and performs the same calculation operation.

By repeating the aforementioned processing, the correction data HVx1, HVx3, HVx5, ..., HVxs for the even-numbered columns (columns $X_1$, $X_3$, $X_5$, ..., $X_s$) are updated when the frame identification signal is at "LOW" level.

Similarly, when the odd-numbered, third frame is read out, the correction data HVx0, HVx2, HVx4, ..., HVxs–1 for the odd-numbered columns are updated. When the even-numbered, fourth frame is read out, the correction data HVx1, HVx3, HVx5, ..., HVxs for the even-numbered columns are updated.

That is, the number of pixels read out from the VOB portion for each frame reduces to a half in the entire VOB portion, thus shortening the transfer time. Also, the correction data updated for each frame reduces to a half in the first embodiment.

As in the first embodiment, the pixel data is corrected by a correction unit 107 in accordance with the readout region and the readout start address, and output from an image processing unit 108 to a storage unit 110 or a display unit 109.

Although the column on which VOB signals from the VOB portion are thinned out is switched for each frame, that on which VOB signals from the VOB portion are thinned out may be switched for each row.

According to this embodiment, not only correction can be appropriately performed, as in the first embodiment, but also the pixel data readout time can be shortened by thinning out VOB signals for each frame or each row, thus reducing the readout clock and power consumption.

[Other Embodiments]

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-045703, filed Mar. 2, 2011, which is hereby incorporated by reference herein in its entirety.

What is claimed is:

1. An image capturing apparatus comprising:
an image sensing element including an effective pixel portion in which a plurality of pixels are two-dimensionally arrayed in a row direction and a column direction, and a shading pixel portion provided on at least one line at an end portion of said effective pixel portion in the row direction or the column direction;
a setting unit configured to variably set, in at least one of the row direction and the column direction, an effective pixel signal readout region in which effective pixel signals are read out from said effective pixel portion, and a shading pixel signal readout region in which shading pixel signals are read out from said shading pixel portion;
a readout unit configured to read out the effective pixel signals from the effective pixel signal readout region, and read out the shading pixel signals from the shading pixel signal readout region;
a correction data generation unit configured to generate correction data for each column or each row based on the shading pixel signals read out by said readout unit;
a correction data storage unit configured to store the correction data generated by the correction data generation unit;
a correction unit configured to correct luminance levels of the effective pixel signals, read out by said readout unit, for each column or each row using the correction data; and
a control unit configured to control said setting unit so that the shading pixel signal readout region becomes wider than the effective pixel signal readout region,
wherein in a case that the effective pixel signal readout region and shading pixel signal readout region set by the setting unit are changed, the correction data generation unit generates correction data based on the shading pixel signals read out from the shading pixel signal readout region changed by the control unit and updates the correction data that has been already stored in the correction data storage unit to latest correction data, and
the correction unit corrects luminance levels of the effective pixel signals by using the difference between the correction data corresponding to the changed shading pixel signal readout region and the effective pixel signals read out from the effective pixel signal readout region.

2. The apparatus according to claim 1, wherein when said correction data generation unit generates the correction data, said control unit controls said readout unit to thin out and read out the shading pixel signals from said shading pixel portion for every other column in the column direction, and switch, for each frame, a column on which the shading pixel signals are thinned out.

3. The apparatus according to claim 1, wherein when said correction data generation unit generates the correction data, said control unit controls said readout unit to thin out and read out the shading pixel signals from said shading pixel portion for every other column in the column direction, and switch, for every other row, a column on which the shading pixel signals are thinned out.

4. The apparatus according to claim 1, further comprising a detection unit configured to detect a blur amount of the image capturing apparatus,
wherein said control unit changes the effective pixel signal readout region set by said setting unit, in accordance with the blur amount detected by said detection unit.

5. The apparatus according to claim 4, wherein said control unit controls said setting unit to set a range in which the effective pixel signal readout region corresponding to the blur amount can be changed for each frame.

6. The apparatus according to claim 1, wherein said image sensing element includes at least one amplifier unit for each column.

7. A control method of an image capturing apparatus comprising an image sensing element including an effective pixel portion in which a plurality of pixels are two-dimensionally arrayed in a row direction and a column direction, and a shading pixel portion provided on at least one line at an end portion of the effective pixel portion in the row direction or the column direction; a setting unit configured to variably set, in at least one of the row direction and the column direction, an effective pixel signal readout region in which effective pixel signals are read out from the effective pixel portion, and a shading pixel signal readout region in which shading pixel signals are read out from the shading pixel portion; and a readout unit configured to read out the effective pixel signals from the effective pixel signal readout region, and read out the shading pixel signals from the shading pixel signal readout region, the method comprising:

a correction data generation step of generating correction data for each column or each row based on the shading pixel signals read out by the readout unit;

a correction data storage step of storing the correction data generated by the correction data generation step;

a correction step of correcting luminance levels of the effective pixel signals, read out by the readout unit, for each column or each row using the correction data; and a control step of controlling the setting unit so that the shading pixel signal readout region becomes wider than the effective pixel signal readout region, wherein in a case that the effective pixel signal readout region and shading pixel signal readout region set by the setting unit are changed, the correction data generation step generates correction data based on the shading pixel signals read out from the shading pixel signal readout region changed by the control step and updates the correction data that has been already stored in the correction data storage step to latest correction data, and the correction step corrects luminance levels of the effective pixel signals by using the difference between the correction data corresponding to the changed shading pixel signal readout region and the effective pixel signals read out from the effective pixel signal readout region.

8. The method according to claim 7, wherein when the correction data is generated in the correction data generation step, in the control step the readout unit is controlled to thin out and read out the shading pixel signals from the shading pixel portion for every other column in the column direction, and switch, for each frame, a column on which the shading pixel signals are thinned out.

9. The method according to claim 7, wherein when the correction data is generated in the correction data generation step, in the control step the readout unit is controlled to thin out and read out the shading pixel signals from the shading pixel portion for every other column in the column direction, and switch, for every other row, a column on which the shading pixel signals are thinned out.

10. The method according to claim 7, wherein the image capturing apparatus further comprises a detection unit configured to detect a blur amount of the image capturing apparatus, and wherein in the control step, the effective pixel signal readout region set by the setting unit is changed in accordance with the blur amount detected by the detection unit.

11. The method according to claim 10, wherein in the control step, the setting unit is controlled to set a range in which the effective pixel signal readout region corresponding to the blur amount can be changed for each frame.

12. A non-transitory computer-readable storage medium storing a program for causing a computer to execute the control method according to claim 7.

13. An image capturing apparatus comprising:

an image sensing element including an effective pixel portion in which a plurality of pixels are two-dimensionally arrayed in a row direction and a column direction, and a standard pixel portion provided on at least one line at an end portion of said effective pixel portion the row direction or the column direction;

a controller configured to variably set, in at least one of the row direction. and the column direction, an effective pixel signal readout region in which effective pixel signals are read out from said effective pixel portion, and a standard pixel signal readout region in which standard pixel signals are read out from said standard pixel portion so that the standard pixel signal readout region becomes wider than the effective pixel signal readout region in at least one of the row direction and the column direction, and configured to read out the effective pixel signals from the effective pixel signal readout region and the standard pixel signals from the standard pixel signal readout region, wherein correction data for correcting the effective pixel signals is generated based on the standard pixel signals.

14. The apparatus according to claim 13, wherein said controller sets the standard pixel signal readout region narrower than the whole standard pixel region in at least one of the row direction and the column direction.

15. The apparatus according to claim 13, wherein said controller detects a blur amount of the image capturing apparatus and changes the effective pixel signal readout region in accordance with the blur amount.

16. The apparatus according to claim 15, wherein said controller sets a range in which the effective pixel signal readout region corresponding to the blur amount can be changed for each frame.

17. The apparatus according to claim 13, wherein said image sensing element includes at least one amplifier unit for each column.

18. A control method of an image capturing apparatus comprising an image sensing element including an effective pixel portion in which a plurality of pixels are two-dimensionally arrayed in a row direction and a column direction, and a standard pixel portion provided on at least one line at an end portion of the effective pixel portion in the row direction or the column direction, the method comprising:

a control step of variably setting, in at least one of the row direction and the column direction, an effective pixel signal readout region in which effective pixel signals are read out from said effective pixel portion, and a standard pixel signal readout region in which standard pixel signals are read out from said standard pixel portion so that the standard pixel signal readout region becomes wider than the effective pixel signal readout region in at least one of the row direction and the column direction, and reading out the effective pixel signals from the effective pixel signal readout region and the standard pixel signals from the standard pixel signal readout region, wherein correction data for correcting the effective pixel signals is generated based on the standard pixel signals.

19. The method according to claim 18, wherein in the control step, setting the standard pixel signal readout region is narrower than the whole standard pixel region in at least one of the row direction and the column direction.

20. The method according to claim 18, wherein in the control step, detecting a blur amount of the image capturing apparatus and changing the effective pixel signal readout region in accordance with the blur amount.

21. The method according to claim 20, wherein in the control step, setting a range in which the effective pixel signal readout region corresponding to the blur amount can be changed for each frame.

22. A non-transitory computer-readable storage medium storing a program for causing a computer to execute the control method according to claim 18.

* * * * *